(12) United States Patent
El Hattachi

(10) Patent No.: US 9,154,944 B2
(45) Date of Patent: Oct. 6, 2015

(54) METHOD, NETWORK ENTITY, TELECOMMUNICATIONS NETWORK AND COMPUTER PROGRAM PRODUCT FOR HANDLING SUBSCRIPTION DATA IN A TELECOMMUNICATIONS NETWORK

(75) Inventor: Rachid El Hattachi, The Hague (NL)

(73) Assignee: T-MOBILE NEDERLAND BV, The Hague (NL)

( * ) Notice: Subject to any disclaimer, the term of this patent is extended or adjusted under 35 U.S.C. 154(b) by 240 days.

(21) Appl. No.: 13/521,447

(22) PCT Filed: Jan. 11, 2011

(86) PCT No.: PCT/EP2011/000067
§ 371 (c)(1),
(2), (4) Date: Sep. 26, 2012

(87) PCT Pub. No.: WO2011/083096
PCT Pub. Date: Jul. 14, 2011

(65) Prior Publication Data
US 2013/0023244 A1    Jan. 24, 2013

Related U.S. Application Data

(60) Provisional application No. 61/293,836, filed on Jan. 11, 2010.

(30) Foreign Application Priority Data

Jan. 11, 2010    (EP) ..................... 10000140

(51) Int. Cl.
*H04M 11/10*    (2006.01)
*H04W 8/26*    (2009.01)
*H04W 4/00*    (2009.01)
(Continued)

(52) U.S. Cl.
CPC ............. *H04W 8/265* (2013.01); *H04W 8/04* (2013.01); *H04W 8/20* (2013.01)

(58) Field of Classification Search
CPC .......... H04W 8/265; H04W 8/04; H04W 8/20
USPC ........................................... 455/413
See application file for complete search history.

(56) References Cited

U.S. PATENT DOCUMENTS 6,961,564 B2 *   11/2005   Silfverberg et al. ....... 455/432.3
2003/0190913 A1 * 10/2003  Coad et al. ................ 455/435.1
(Continued)

FOREIGN PATENT DOCUMENTS

EP    1942692 A1    7/2008
EP    2114063 A1    11/2009
(Continued)

OTHER PUBLICATIONS

European Patent Office, International Search Report in International Patent Application No. PCT/EP2011/00067 (Mar. 30, 2011).

*Primary Examiner* — Timothy Pham
(74) *Attorney, Agent, or Firm* — Leydig, Voit & Mayer, Ltd.

(57) ABSTRACT

A method is provided for handling subscription data in a telecommunications network having first, second, and third network entities, the first network entity providing the functions of at least one of a Home Subscriber Server (HSS) and a Home Location Register (HLR), the second network entity providing the functions of at least one of a Visitor Location Register (VLR) and a Mobile Management Entity (MME), and the third network entity providing routing functionality. The method includes: storing first subscription data; receiving, by the third network entity, a first message with regard to the subscriber; and sending, by the third network entity, a second message to the first network entity.

10 Claims, 12 Drawing Sheets

1 first network entity
2 second network entity
3 third network entity
4 fourth network entity
10 telecommunications network
21 subscriber database
22 first module
23 second module
24 provisioning module
25 IT provisioning system
100 subscription data
120 profile data

(51) Int. Cl.
*H04W 8/04* (2009.01)
*H04W 8/20* (2009.01)

(56) References Cited

U.S. PATENT DOCUMENTS

2004/0132449 A1* 7/2004 Kowarsch .................. 455/432.1
2005/0202816 A1* 9/2005 Warsta et al. ................ 455/433
2006/0058028 A1  3/2006 Allison et al.
2010/0062751 A1* 3/2010 Russell et al. ................ 455/417

FOREIGN PATENT DOCUMENTS

| WO | WO 02098156 A1 | 12/2002 |
| WO | WO 2004028191 A1 | 4/2004 |
| WO | WO 2009053918 A2 | 4/2009 |

* cited by examiner 1 first network entity
2 second network entity
3 third network entity
4 fourth network entity
10 telecommunications network
21 subscriber database
22 first module
23 second module
24 provisioning module
25 IT provisioning system
100 subscription data
120 profile data

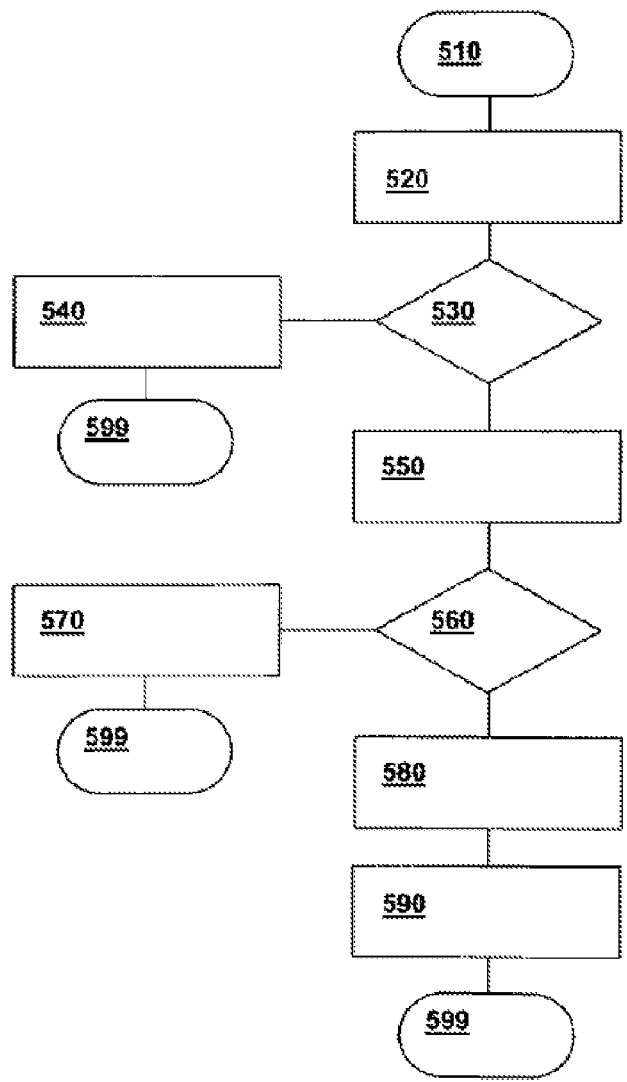

Fig. 2

510 the second network entity waits for messages
520 an incoming message is received from the third network entity
530 it is decided whether the message is a first message
540 if the message is not a first message, the message is transferred to the message destination
550 if the message is possibly a first message, the subscriber database of the second network entity is searched
560 it is decided whether the subscriber is a pre-active or pre-provisioned subscriber
570 if the subscriber is not a pre-active or pre-provisioned subscriber, the second network entity transfers the Location Update message to its destination
580 if the subscriber is a pre-active or pre-provisioned subscriber, the second message is generated by the second network entity and transmitted to the first network entity such that the subscriber is provisioned by the first network entity
590 the corresponding response from the first network entity is positive
599 handling of the message is terminated

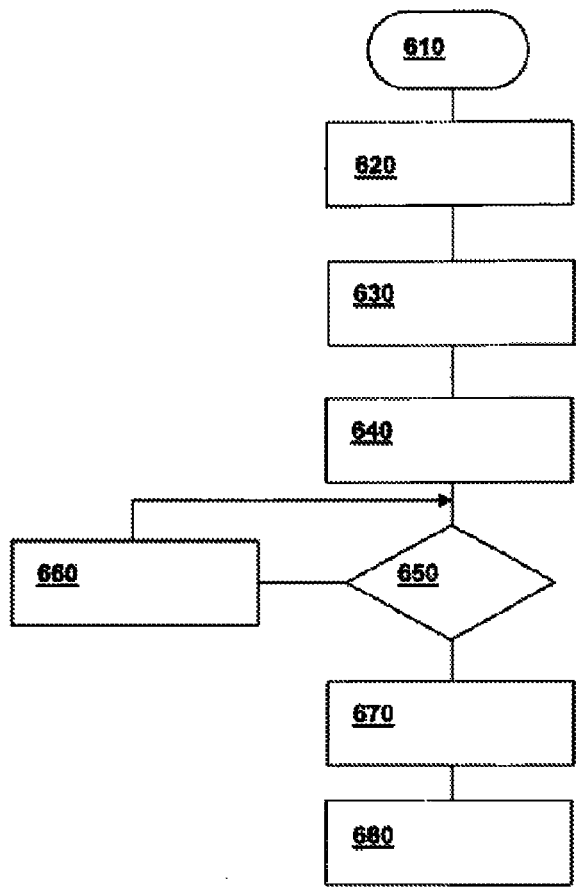

Fig. 3

610 the workflow waits for messages and commands
620 in case an initial provisioning message is received from the IT Provisioning System this message or corresponding information is stored in the subscriber database
630 a provisioning instruction is received from the first module of the second network entity
640 the first and fourth network entities are provisioned using default profiles
650 it is decided whether this provisioning of the first and fourth network entities has been successful
660 if the provision was not successful, the provisioning is performed again
670 if the provision was successful, a positive acknowledgement message is sent to the first module of the second network entity
680 the respective subscriber is deleted from the subscriber database
690

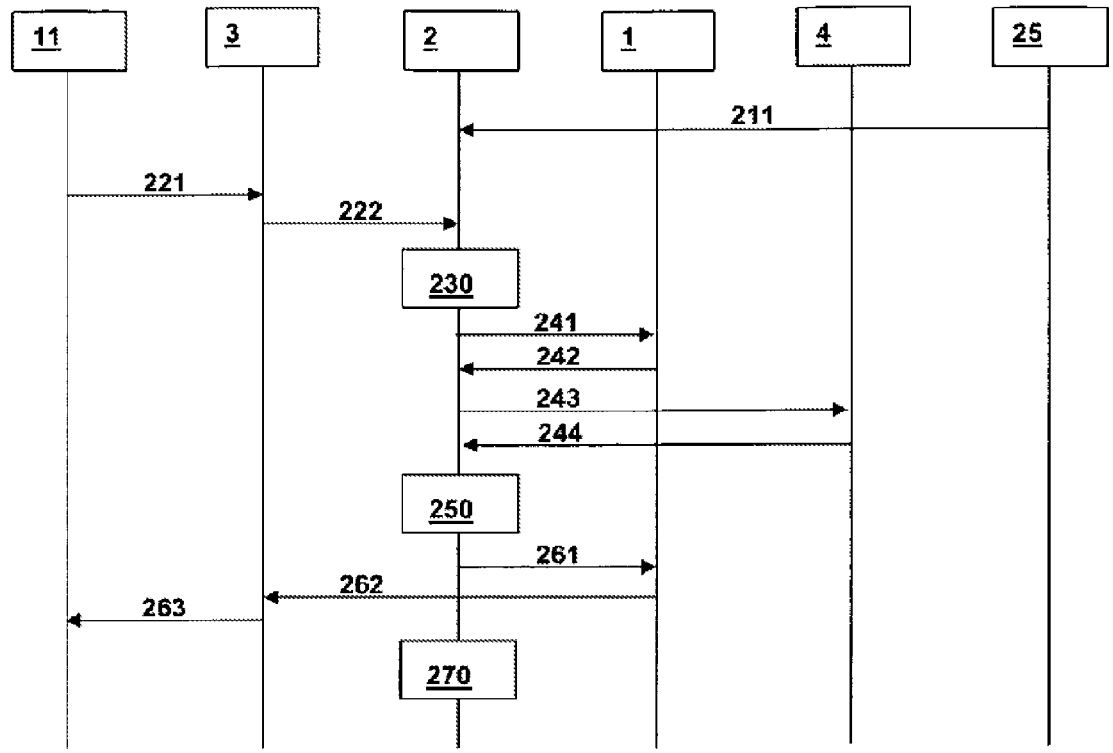

Fig. 4

1 first network entity
2 second network entity
3 third network entity
4 fourth network entity
11 mobile station
25 IT provisioning system
211 message
221 message
222 first message
230 the second network entity validates that the subscriber is a pre-active subscriber
241 second message
242 return message
243 third message
244 return message
250 the second network entity receives the successful acknowledgement messages from the first and fourth network entities
261 delayed Location update message
262 Location update response
263 Location update response
270 the subscriber is deleted from the subscriber database 1 first network entity
2 second network entity
3 third network entity
4 fourth network entity
12 mobile station
25 IT provisioning system
311 message
321 message
322 Location Update message
330 the second network entity validates that the subscriber is not a pre-active subscriber
341 Location Update message
361 Location update response
362 Location update response

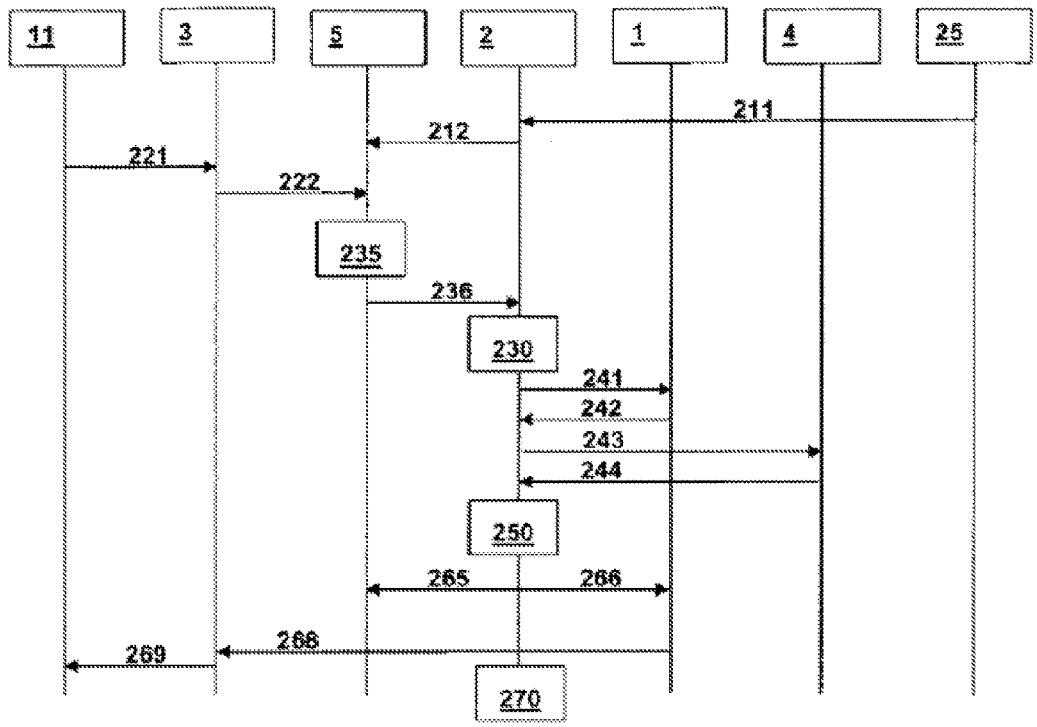

Fig. 6

1 first network entity
2 second network entity
3 third network entity
4 fourth network entity
5 fifth network entity
11 mobile station
25 IT provisioning system
211 message
212 message
221 message
222 first message
230 the second network entity validates that the subscriber is a pre-active subscriber
235 the fifth network entity determines that the International Mobile Subscriber Identity (IMSI) and/or the MSISDN number of the subscriber points to the second network entity
236 Location Update message 241 second message
242 return message
243 third message
244 return message
250 the second network entity receives the successful acknowledgement messages from the first and fourth network entities
265 message
266 Location update message
268 Location update response
269 Location update response
270 the subscriber is deleted from the subscriber database 1 first network entity
2 second network entity
3 third network entity
4 fourth network entity
5 fifth network entity
10 telecommunications network
21 subscriber database
22 first module
23 second module
24 provisioning module
25 IT provisioning system
100 subscription data
120 profile data 1 first network entity
2 second network entity
3 third network entity
4 fourth network entity
5 fifth network entity
10 telecommunications network
21 subscriber database
22 first module
23 second module
24 provisioning module
25 IT provisioning system
100 subscription data
120 profile data

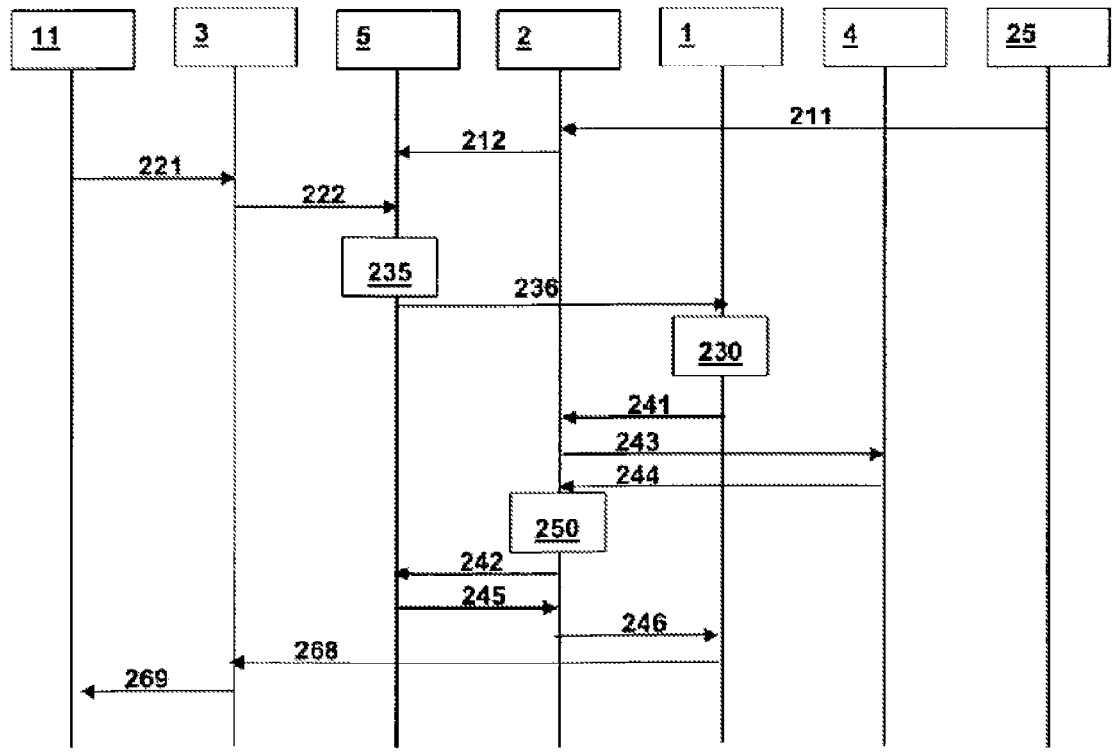

Fig. 9

1 first network entity
2 second network entity
3 third network entity
4 fourth network entity
5 fifth network entity
11 mobile station
25 IT provisioning system
211 message
212 message
221 message
222 first message
230 the second network entity validates that the subscriber is a pre-active subscriber
235 the fifth network entity determines the information to be forwarded to the first network entity
236 Location Update message
241 fifth message
242 seventh message
243 sixth message
244 return message
245 return message
246 message
250 the second network entity receives the successful acknowledgement messages from the first and fourth network entities
268 Location update response
269 Location update response 1 first network entity
3 third network entity
4 fourth network entity
5 fifth network entity
25 IT provisioning system

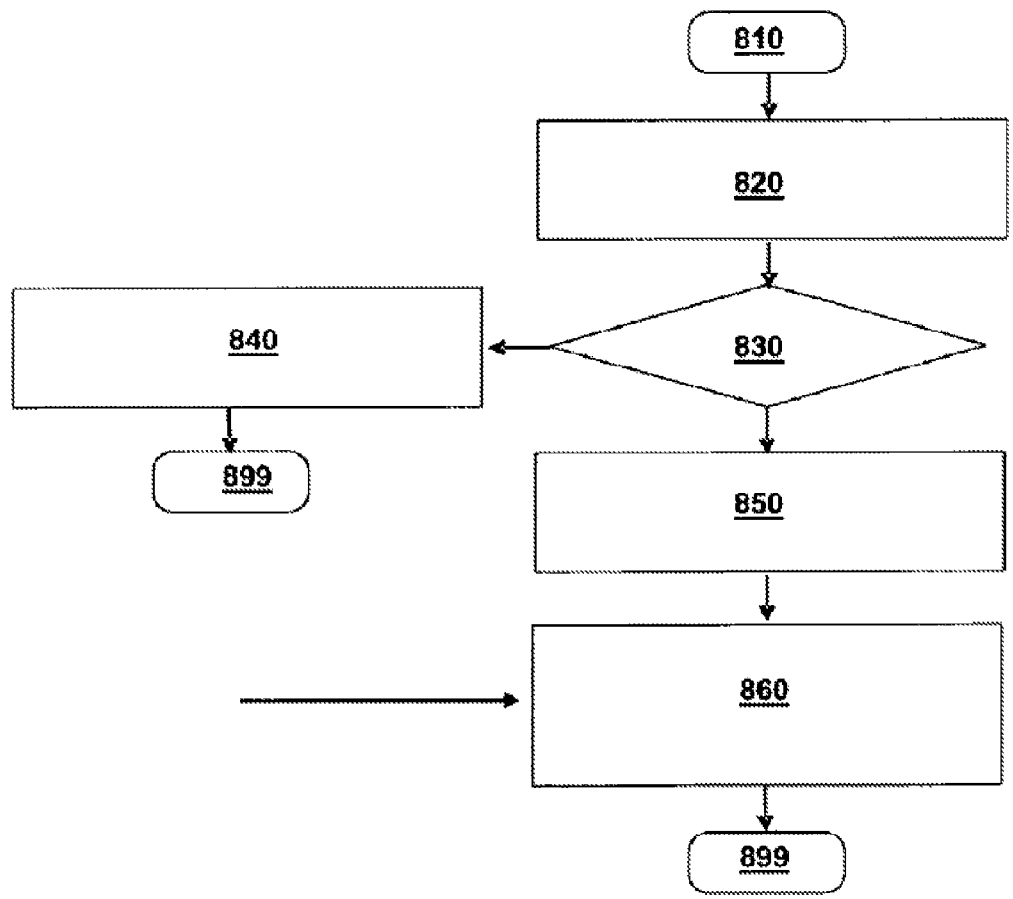

Fig. 11

810 the first network entity receives a location update message
820 the first network entity analyzes the global title type on the SCCP layer
830 the first network entity checks whether the subscriber is an active subscriber
840 the first network entity sends a positive acknowledgement to the third network entity
850 the first entity creates and activates the subscriber
860 the first network entity sends a positive acknowledgment to the third network entity
899 the first entity terminates the processing

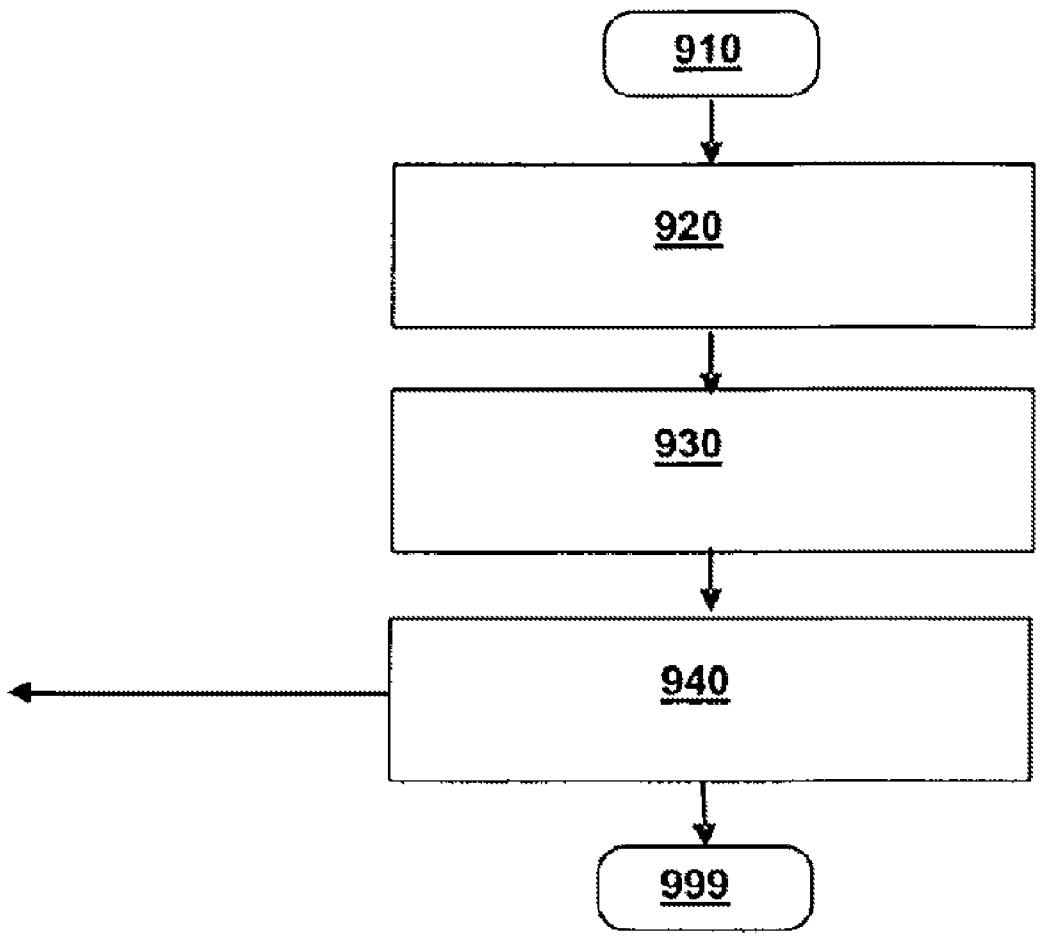

Fig. 12

910/920 the second network entity receives the fifth message from the first network entity
930 a provisioning message is sent to all service nodes
940 a message is sent to the fifth network entity and the second network entity informs the first network entity about the successful creation of the profiles of the fourth network entity and the successful change of subscriber state in the fifth network entity
999 processing is terminated

US 9,154,944 B2

METHOD, NETWORK ENTITY, TELECOMMUNICATIONS NETWORK AND COMPUTER PROGRAM PRODUCT FOR HANDLING SUBSCRIPTION DATA IN A TELECOMMUNICATIONS NETWORK

CROSS-REFERENCE TO RELATED APPLICATIONS

This patent application is a national stage entry under 35 U.S.C. §371 of International Application No. PCT/EP2011/000067, filed Jan. 11, 2011, and claims priority to European Patent Application No. EP 10000140.3, filed Jan. 11, 2010, and U.S. Provisional Patent Application No. 61/293,836, filed Jan. 11, 2010. The International Application was published in English on Jul. 14, 2011, as WO 2011/083096 A1.

FIELD

The present invention relates to a method, a network entity, a telecommunications network, and a computer program product for handling subscription data in a telecommunications network, wherein the telecommunications network includes a first network entity providing the functions of a Home Subscriber Server (HSS) and/or of a Home Location Register (HLR), wherein the telecommunications network is preferably a cellular mobile network like, GERAN, UTRAN, LTE/E-UTRAN, LTE-Advanced, cdma2000, WiMAX, WiBro, or a fixed network (e.g. SIP telephony) etc. The invention particularly relates to methods, network entities, telecommunications networks and computer program products for provisioning network entities, such as a Home Location Register (HLR) and/or a Home Subscriber Server (HSS), with mobile subscriber information.

BACKGROUND

In mobile telecommunications networks, it is necessary for subscriptions to be set up before they can be put it use, that is before they are activated. Setting up a subscription is referred to as "provisioning" and involves creating a complete subscription which is active in the relevant network database/register, e.g. a Home Location Register (HLR). Prior to being an active (or complete) subscription, a subscription is also called a provisional subscription or a pre-provisioned subscription. It is typical for a significant number of subscribers to a wireless network service to be pre-paid subscribers with the others being post-paid subscribers. Network operators use methods of pre-provisioning of subscriptions to create the subscriptions in the network system before they are handed over to subscribers to enable flexible SIM card delivery via appropriate retail chains. This means that subscribers need to be pre-provisioned in Core Elements of mobile telecommunications networks as well as in Service Elements of mobile telecommunications networks before the SIM card (Subscriber Identity Module card) can actually be used for the first time in the network. In a mobile network, storage of subscriber-related data is costly due to associated fees like license fees, hardware requirements and system performance requirements. Most operators of mobile telecommunications networks pre-provision the Home Location Register (HLR) with a default profile as part of the logistics/supply-chain of SIM cards. Pre-provisioning means the main parts (at least the required identities and the authentication data) of a subscription are created in the network, either in a back-end repository or even directly in an HLR. The subscription data is valid but the subscription is not yet active, i.e. the subscription is provisional. An example is described, e.g., in European Patent Application EP 2 114 063 A1.

Conventional systems and methods require a routing node (typically called an STP or SRR) to route the messages related to pre-provisioned inactive subscribers to a pre-provisioning system/center for the purpose of provisioning the subscriber in the commercial HLR/HSS and the Service Nodes. A routing node contains a database that maps the IMSI of active subscribers to the correct HLR/HSS. In this way the routing node is able to route the messages for active subscribers to the HLR that contains subscription data of that specific subscriber.

Such a routing node can also be extended by a second database containing IMSIs of pre-provisioned not yet active subscribers. The IMSIs for these subscribers are then mapped to a pre-provisioning system/center. Messages related to pre-provisioned not yet active subscribers can then be routed to a pre-provisioning system/center (e.g., as described in WO 2002/098156 A1, US 2006/058028 or WO 2009/053918 A2) or a system that combines HLR functionality with a provisioning capability (e.g., as described in WO 2004/028191 A1).

According to other conventional methods and systems, the Home Location Register (HLR) is required to perform additional operations compared to the standard Home Location Register (HLR). This requires development efforts and associated costs on existing Home Location Register (HLR) platforms. Such a modification is costly as a multitude of existing interfaces between existing network entities would need to be modified and kept up to date. Furthermore, conventional solutions related to pre-provisioning are restricted to the pre-provisioning of the Home Location Register (HLR), i.e. the pre-provisioning of the Home Subscriber Server (HSS) and other service nodes (e.g. IN/SCP) are not addressed.

Most conventional systems and methods require storing subscriber information related to pre-provisioned subscribers on the pre-provisioning center. Furthermore, conventional systems and methods require the routing node to inform the pre-provisioning center/system to provision the HLRs if a subscriber becomes active on the network.

Some conventional systems and methods even require the provisioning of provisional subscriber information both on a routing node as well as on a pre-provisioning system/center.

Some conventional systems and methods provide a temporary restricted service as part of the provisioning process after the subscriber attempts to access the network for the first time. Other conventional systems and methods require the subscriber to switch-off and switch on the device to complete the provisioning process.

SUMMARY

In an embodiment, the present invention provides a method for handling subscription data in a telecommunications network having first, second, and third network entities, the first network entity providing the functions of at least one of a Home Subscriber Server (HSS) and a Home Location Register (HLR), the second network entity providing the functions of at least one of a Visitor Location Register (VLR) and a Mobile Management Entity (MME), and the third network entity providing routing functionality. The method includes: storing first subscription data, wherein the first subscription data is provisional subscription data of a subscriber not yet active in the telecommunications network; receiving, by the third network entity, a first message with regard to the subscriber, wherein the first message is sent by the second network entity and is directed to the first network entity; and sending, by the third network entity, a second message to the first network entity, the second message including an indication that a subscription of the subscriber is a provisional subscription. The first network entity includes profile information such that the subscriber becomes an active subscriber.

BRIEF DESCRIPTION OF THE DRAWINGS

FIGS. 2 and 3 schematically illustrate flow diagrams representing the flow of operations according to the first exemplary embodiment of the present invention.

FIGS. 4, 5 schematically illustrate communication diagrams according to the first exemplary embodiment of the present invention for a pre-provisioned subscriber and for an active subscriber.

FIG. 6 schematically illustrates a communication diagram according to a second exemplary embodiment of the present invention.

FIG. 9 schematically illustrates a part of a telecommunications network including different network entities according to the third exemplary embodiment.

FIGS. 11 to 12 schematically illustrate flow diagrams representing the flow of operations according to the third exemplary embodiment of the present invention.

DETAILED DESCRIPTION

Figure 1:
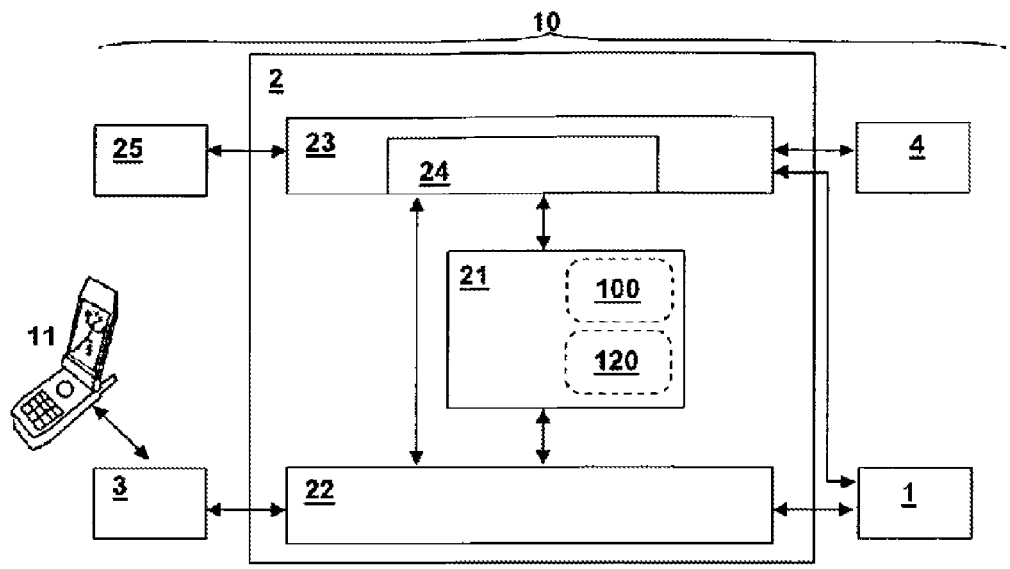
FIG. 1 schematically illustrates a part of a telecommunications network including different network entities according to a first exemplary embodiment of the present invention.

Embodiments of the present invention provide a method, a network entity, a telecommunications network, and a computer program product for handling subscription data in a telecommunications network such that the costs and the complexity of the pre-provisioning process and of the provisioning process of subscriber data is reduced.

According to first and second exemplary embodiments, the present invention provides a method for handling subscription data in a telecommunications network, wherein the telecommunications network includes a first network entity providing the functions of a Home Subscriber Server (HSS) and/or of a Home Location Register (HLR), wherein the telecommunications network includes a second network entity providing a subscription management function, wherein the telecommunications network includes a third network entity providing the functions of a Visitor Location Register (VLR) and/or of a Mobile Management Entity (MME), wherein the method includes the steps of:

storing first subscription data in a subscriber database assigned to the second network entity, the first subscription data being provisional subscription data of a subscriber not yet active in the telecommunications network;

the second network entity receiving a first message directed to the first network entity and sent by the third network entity with regard to the subscriber;

the second network entity sending a second message to the first network entity, the second message including the first subscription data such that the subscriber becomes an active subscriber and that second subscription data are stored in a further subscriber database assigned to the first network entity.

According to a third exemplary embodiment, the present invention provides a method for handling subscription data in a telecommunications network, wherein the telecommunications network includes a first network entity providing the functions of a Home Subscriber Server (HSS) and/or of a Home Location Register (HLR), wherein the telecommunications network includes a third network entity providing the functions of a Visitor Location Register (VLR) and/or of a Mobile Management Entity (MME), wherein the telecommunications network includes a fifth network entity providing a routing functionality, wherein the method includes the steps of:

storing first subscription data in a subscriber database, the first subscription data being provisional subscription data of a subscriber not yet active in the telecommunications network;

the fifth network entity receiving a first message with regard to the subscriber, the first message being sent by the third network entity and being directed to the first network entity;

the fifth network entity sending a second message to the first network entity, the second message including only an indication that a subscription of the subscriber is a provisional subscription, wherein the first network entity includes a profile information such that the subscriber becomes an active subscriber.

Embodiments of the present invention provide a system and a method for intelligent management of subscriber information in the Home Location Register (HLR), the Home Subscriber Server (HSS) and other Service Nodes in a mobile telecommunications network environment. Thereby, it is possible to reduce the required Home Location Register (HLR), Home Subscriber Server (HSS) and Service Node database space and consequently, it is possible to avoid negative performance impact due to pre-provisioning of subscribers. A cost-effective system and method for intelligent subscription management in a mobile communications network operator environment is possible. Embodiments of the present invention decreases license/database based capacity requirements in telecommunications core network and services network.

Furthermore, it is advantageously possible that no change to the respective interfaces and to the mode of operation of the existing network entities like Home Location Register (HLR), Home Subscriber Server (HSS) or Service Nodes needs to be realized. In a mobile telecommunications network environment, more and more access technologies as well as more and more service nodes are added to the telecommunications network. These technology changes come with their specific subscriber databases. As embodiments of the present invention do not require development on existing standard components, it allows an easy expansion to cope with new networks and new service nodes.

According to first and second exemplary embodiment of the present invention, instead of pre-provisioning the commercial Home Location Register (HLR), Home Subscriber Server (HSS) and Service Nodes as part of the logistical process, a second network entity is pre-provisioned, which is hereinafter also called an Intelligent Subscription Management Center (ISMC).

It is not only possible to reduce the complexity of the pre-provisioning process within the telecommunications network, i.e. between the different network entities requiring subscription information, but also to reduce the required memory space for pre-provisioned subscribers, also called provisional subscription data. This is possible by storing for at least a certain number of provisional subscribers identical profile information in the subscriber database of the second network entity. If, e.g., all pre-provisioned subscribers should have an identical profile (i.e. identical profile information of the kind of "having Multimedia Message Service (MMS) functionality" or "not having MMS functionality") then only one default set of profile information is to be stored. This largely reduces the required memory resources for such pre-provisioned subscribers. If, on the other hand, a plurality of different groups of pre-provisioned subscribers should be provided (e.g. different groups related to different advertising or other marketing efforts targeting different types of users and therefore providing differently featured functionality regarding the proposed network access and hence different profile information), then a plurality of different default profiles (e.g., a first profile, a second profile or the like) is to be stored in the subscriber database of the second network entity (i.e. in the Intelligent Subscription Management Center (ISMC)). However, even in the second case, the number of different default profile types (for specific groups of pre-provisioned subscribers) being low compared to the total number of pre-provisioned subscribers, embodiments of the present invention provide for reduced memory requirements with respect to storing pre-provisioned subscribers compared to storing such pre-provisioned subscribers in a Home Location Register (HLR) or Home Subscriber Server (HSS) where every subscribers needs to have its profile information related to its individual profile.

According to the first and a second exemplary embodiments, all messages from the third network entity are handled either by the second network entity or by the fifth network entity.

According to a third exemplary embodiment of the present invention, there is no need to provision any pre-provisioning system with initial provisional subscriber information that are subscriber specific. The presented pre-provisioning system, which is hereinafter called an Intelligent Subscription Management Center (ISMC), is only containing default profiles related to the provisioning of the fourth network entity (or plurality of fourth network entities, also called service nodes). Furthermore according to the third exemplary embodiment of the present invention, there is no need for the subscriber to perform any action as part of the activation process (e.g. switch off the device and switch it on again or wait for couple of minutes before the subscriber can get access to the services).

Furthermore, in the third exemplary embodiment it is not necessary for the second entity to scan all the messages between the third and the first network entity.

Furthermore and according to all three exemplary embodiments of the present invention, the first network entity (Home Location Register (HLR) and/or Home Subscriber Server (HSS)) is provided with the necessary information in order to generate the subscriber information in the situation where the respective subscriber attempts to have a network access for the first time. This means that it is not the first network entity (Home Location Register (HLR) or Home Subscriber Server (HSS)) that retrieves the needed subscriber information related to a subscriber that is—at a specific point in time—unknown to the first network entity (Home Location Register (HLR) or Home Subscriber Server (HSS)), but according to the first and second exemplary embodiments, for every subscriber that is unknown to the first network entity (Home Location Register (HLR) or Home Subscriber Server (HSS)) these subscriber data are provided once the second (or fifth) network entity has detected that the third network entity (Visitor Location Register (VLR) or Mobile Management Entity (MME)) attempted to send the first message to the first network entity (Home Location Register (HLR) or Home Subscriber Server (HSS)) in order to realize a network contact of an (at this time) unknown subscriber according to the third exemplary embodiment, for every subscriber that is only pre-provisioned in the telecommunications network, the first network entity (Home Location Register (HLR) or Home Subscriber Server (HSS)) receives the second message from the fifth network entity and the second message includes an indication that the subscription of the subscriber is a provisional subscription, wherein the first network entity includes a profile information such that the complete subscriber information (including the profile of the generated subscriber) can be generated and the subscriber becomes an active subscriber.

This means that according to embodiments of the present invention, the first message serves as a trigger (to the second network entity or Intelligent Subscription Management Center (ISMC) or to the fifth network entity) to provision the subscriber in the first network entity (Home Location Register (HLR) or Home Subscriber Server (HSS)). By this provisioning, the (previously provisional or pre-active) subscriber becomes an active subscriber in the telecommunications network, i.e. from that time on, the subscriber is known to the first network entity (i.e. the Home Location Register (HLR) or Home Subscriber Server (HSS)). The provisioning of the first network entity (Home Location Register (HLR) or Home Subscriber Server (HSS)) with the subscription information of such a subscriber is made (or such that the subscriber information are generated) by way of the second message, i.e. the second message either includes the relevant subscription information (first and second exemplary embodiments of the present invention) or the second message refers to the relevant subscription information (third exemplary embodiment of the present invention). In an embodiment, the first message is a message requesting a first time network contact for a specific subscriber, such as a location update message.

According to the first exemplary embodiment, all such messages requesting network contact are scanned by the second network entity such that for subscribers unknown to the first network entity a provisioning procedure can be initiated by the second network entity. In an embodiment, the first message is a Location Update message associated with the (initial non-provisional) subscription of the subscriber to the telecommunications network.

According to the first and second exemplary embodiments, the subscription data of the pre-provisioned subscribers, i.e. the subscriber-specific data (including subscriber specific profile data or the like) are stored in the second network entity or in a device or a location dependent on the second network entity. According to the third exemplary embodiment, the subscription data of the pre-provisioned subscribers (including subscriber specific profile data or the like) are not stored in the second network entity but—besides being stored in the IT provisioning system—there is a subscriber specific routing information stored in the fifth network entity (Signal Transfer Point).

In an embodiment, the telecommunications network includes a fourth network entity providing the functions of a Service Node, wherein the method further includes the steps of:

the second network entity sending a third message to the fourth network entity, the third message including at least partly the first subscription data such that the subscriber becomes a subscriber enabled for the service provided by the fourth network entity.

Thereby, it is advantageously possible to also provision the fourth network entity (i.e. Service Nodes providing network services such as Voice Messaging, Multimedia Messaging, IN services (Intelligent Network services) or the like) by the second network entity such that no specific pre-provisioning database and pre-provisioning procedure is required for such Service Nodes. This means that additionally to (pre-)provision the Home Location Register (HLR), mobile telecommunications network operators might also have to pre-provision so-called network entities, hereinafter also called service nodes or fourth network entity or entities. Such service nodes (or fourth network entities) are network entities that provide a service (or functionality) to the subscriber and/or to another network entity and such service nodes (or fourth network entities) require the provision of subscriber data for this service (or functionality) to work. This means that such a fourth network entity includes or is assigned to any generic services profile database that hold specific subscriber profile information for a mobile service or another functionality. Such services nodes or fourth network entities include but are not limited to:
- the Intelligent Network Service Control Point (IN/SCP): e.g. for the subscriber identity, the type of subscriber, initial balance, status, or the like,
- the Voice Messaging System (VMS): e.g. for the subscriber identity, the type of subscriber, Default Languages, or the like,
- the Multimedia Message Service Center (MMSC): e.g. for the subscriber identity, the type of subscriber, Default Languages, or the like,
- other service nodes that require pre-provisioning of some subscriber data for the service to work.

Likewise to the provisioning of the first network entity with the subscription information by way of the second message, also the fourth network entity is provisioned (by the second network entity) with the relevant subscription information by way of a third message, i.e. the third message either includes the relevant subscription information or the third message refers to the relevant subscription information.

According to the third exemplary embodiment of the present invention, the profile information (that is stored in the first network entity) can be unspecific of the subscriber. This means that there is one or a plurality of different possible subscriber profiles stored in the first network entity but these possible subscriber profiles are not related specifically to a given subscriber (or International Mobile Subscriber Identity (IMSI) number). If the second message (from the fifth network entity to the first network entity) concerns a subscriber that is not an active subscriber (i.e. an International Mobile Subscriber Identity (IMSI) of a pre-provisioned subscriber), the second message includes an indication
- that this specific subscriber is not yet active (i.e. the subscription is a provisional subscription) and
- which one of the different possible (standard) subscriber profiles is to be used to generated the subscriber information for that given subscriber.

Furthermore, the first network entity can include:
- a Global Title of the type MGT (Mobile Global Title, E.214) in case of a non-provisional subscription of the subscriber, and
- a Global Title of the type Mobile Station International Subscriber Directory Number (MSISDN, E.164) or of the type International Mobile Subscriber Identity (IMSI, E.212) in case of a provisional subscription of the subscriber 11.

As part of the Global Title of the second message, digits can be used to convey a profile ID information to the first network entity.

Thereby, it is advantageously possible to use digits, i.e. a part of the Global Title, to convey the profile ID information to the first network entity 1 allowing the first network entity 1 to find the right profile for the subscriber indicated in or concerned by the message.

Furthermore, the type of the Global Title can depend on the subscription status of the subscriber.

Thereby, it is advantageously possible that the type of the Global Title is used as a mechanism to inform the first network entity about the subscription status of the subscriber.

Furthermore, the telecommunications network can include a second network entity and a fourth network entity, wherein the second network entity provides a subscription management function, wherein the fourth network entity provides the functions of a Service Node providing a service, wherein the method further includes the steps of:
- the first network entity sending a third message ( ) to the second network entity;
- the second network entity sending a fourth message to the fourth network entity, the fourth message including at least partly the first subscription data such that the subscriber becomes a subscriber enabled for the service provided by the fourth network entity.

In an embodiment, the subscription is a pre-paid subscription. This is particularly important as there is a higher probability (compared to post-paid subscriptions) that a pre-paid subscription is not put in active use after initial pre-provisioning. In an alternative embodiment, the subscription is a post-paid subscription. A further alternative embodiment involves a plurality of subscriptions where part of this plurality of subscriptions are pre-paid subscriptions and another part of this plurality of subscriptions are post-paid subscriptions.

Embodiments of the present invention also relate to a network entity providing a subscription management function in a telecommunications network, wherein the telecommunications network includes a first network entity providing the functions of a Home Subscriber Server (HSS) and/or of a Home Location Register (HLR), wherein the telecommunications network includes the network entity as a second network entity, wherein the telecommunications network includes a third network entity providing the functions of a Visitor Location Register (VLR) and/or of a Mobile Management Entity (MME), wherein a subscriber database is assigned to the second network entity, wherein first subscription data are stored in the subscriber database, wherein the first subscription data are provisional subscription data of a subscriber not yet active in the telecommunications network, wherein for a first message which is sent by the third network entity with regard to the subscriber and which is directed to the first network entity the second network entity is an intermediate network entity such that the second network entity sends a second message to the first network entity, the second message including the first subscription data such that the subscriber becomes an active subscriber and that second subscription data are stored in a further subscriber database assigned to the first network entity.

Embodiments of the present invention also relate to a network entity providing routing functionality in a telecommunications network, wherein the telecommunications network includes a first network entity providing the functions of a Home Subscriber Server (HSS) and/or of a Home Location Register (HLR), wherein the telecommunications network includes the network entity as a fifth network entity, wherein the telecommunications network includes a third network entity providing the functions of a Visitor Location Register (VLR) and/or of a Mobile Management Entity (MME), wherein first subscription data are stored in a subscriber database, the first subscription data being provisional subscription data of a subscriber not yet active in the telecommunications network, wherein the fifth network entity is adapted for receiving a first message with regard to the subscriber, the first message being sent by the third network entity and being directed to the first network entity, wherein the fifth network entity is furthermore adapted for sending a second message to the first network entity, the second message including only an indication that a subscription of the subscriber is a provisional subscription, wherein the first network entity includes a profile information such that the subscriber becomes an active subscriber.

It is advantageously possible that an intermediate layer is created between the third network entity (Visitor Location Register (VLR) or Mobile Management Entity (MME)) on the one hand and the first network entity (Home Location Register (HLR) or Home Subscriber Server (HSS)) on the other hand. Thereby, it is possible to detect the first messages relating to a first-contact of pre-provisioned subscribers to the telecommunications network.

It is furthermore preferred that the telecommunications network includes a fourth network entity providing the functions of a Service Node, wherein the second network entity sends a third message to the fourth network entity, the third message including at least partly the first subscription data such that the subscriber becomes a subscriber enabled for the service provided by the fourth network entity. In an embodiment, the fourth network entity is a Service Node providing the functions of a Multimedia Message Service Center (MMSC) and/or of a Voicemailbox Service Node and/or of an Intelligent Network Service Control Point (IN/SCP).

Embodiments of the present invention also relate to a telecommunications network including:
- a first network entity providing the functions of a Home Subscriber Server (HSS) and/or of a Home Location Register (HLR),
- a second network entity providing a subscription management function,
- a third network entity providing the functions of a Visitor Location Register (VLR) and/or of a Mobile Management Entity (MME), wherein a subscriber database is assigned to the second network entity, wherein first subscription data are stored in the subscriber database, wherein the first subscription data are provisional subscription data of a subscriber not yet active in the telecommunications network, wherein for a first message which is sent by the third network entity with regard to the subscriber and which is directed to the first network entity the second network entity is an intermediate network entity such that the second network entity sends a second message to the first network entity, the second message including the first subscription data such that the subscriber becomes an active subscriber and that second subscription data are stored in a further subscriber database assigned to the first network entity.

Embodiments of the present invention also relate to a telecommunications network including:
- a first network entity providing the functions of a Home Subscriber Server (HSS) and/or of a Home Location Register (HLR),
- a third network entity providing the functions of a Visitor Location Register (VLR) and/or of a Mobile Management Entity (MME),
- a fifth network entity providing a routing functionality, wherein first subscription data are stored in a subscriber database, the first subscription data being provisional subscription data of a subscriber not yet active in the telecommunications network, wherein the fifth network entity is adapted for receiving a first message with regard to the subscriber, the first message being sent by the third network entity and being directed to the first network entity, wherein the fifth network entity is furthermore adapted for sending a second message to the first network entity, the second message including only an indication that a subscription of the subscriber is a provisional subscription, wherein the first network entity includes a profile information such that the subscriber becomes an active subscriber.

Furthermore, embodiments of the present invention relate to
- a program including a computer readable program code for controlling a second network entity providing a subscription management function according to the present invention or for controlling a telecommunications network, and to
- a computer program product including a computer readable software code that when executed on a computing system performs a method for handling subscription data in a telecommunications network.

Exemplary embodiments of the present invention will be described with reference to certain drawings, but it will be appreciated that the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described of illustrated herein.

The techniques described herein may be implemented in various ways. For example, these techniques may be implemented in hardware (one or more devices), firmware (one or more devices), software (one or more modules), or combinations thereof. For a firmware or software, implementation can be through modules (for example, procedures, functions, or the like) that perform the functions described herein. The software codes may be stored in any suitable, processor/computer-readable data storage medium(s) or memory unit(s) and executed by one or more processors/computers. The data storage medium or the memory unit may be implemented within the processor/computer or external to the processor/computer, in which case it can be communicatively coupled to the processor/computer via various implementations as is known in the art. Additionally, components of systems described herein may be rearranged and/or complimented by additional components in order to facilitate achieving the various aspects, goals, advantages, etc., described with regard thereto, and are not limited to the precise configurations set forth in a given figure, as will be appreciated by one skilled in the art.

FIG. 1 schematically illustrates a part of a telecommunications network 10 including different network entities according to a first exemplary embodiment of the present invention. A first network entity 1 provides the functions of a Home Location Register (HLR) and/or of a Home Subscriber Server (HSS). A third network entity 3 provides the functions of a Visitor Location Register (VLR) and/or a Mobile Management Entity (MME). A fourth network entity 4 provides the functions of a Service Node such as an Intelligent Network Service Control Point (IN/SCP) and/or a Voice Messaging System (VMS) and/or a Multimedia Message Service Center (MMSC) and/or any other service node in the telecommunications network 10. A second network entity 2 is configured as an Intelligent Subscription Management Center (ISMC) according to the present invention and serves as a provisioning entity for subscriber-related provisioning information to the first network entity 1 and to the fourth network entity 4. The origin of the subscriber information is a so-called IT provisioning system 25 linked to the Intelligent Subscription Management Center (ISMC) or second network entity 2.

The second network entity 2 includes a subscriber database 21, a first module 22 and a second module 23. The first module 22 is preferably configured as a Signaling Analysis and Transfer Module 22 including a multitude of interfaces, especially an interface according to the MAP protocol (for GSM/UMTS messages) and an interface for the DIAMETER protocol (for LTE messages). The second module 23 is preferably configured as a Subscription Management Module 23 including a Provisioning module 24. Preferably MAP/DIAMETER signaling interfaces are provided between the third network entity 3 and the first module 22 on the one hand and between the first module 22 and the first network entity 1 on the other hand. A database query and modification interface is provided preferably between the first module 22 and the subscriber database 21 (used by the second module 23 of the second network entity 2 to query, create, modify and delete a subscriber in the subscriber database 21) on the one hand and the subscriber database 21 and the Provisioning module 24 (used by the first module 22 of the second network entity 2 to query the subscriber in the subscriber database 21) on the other hand. A provisioning interface is provided preferably between

- the IT provisioning system 25 and the second module 23,
- the second module 23 and the first network entity 1,
- the second module 23 and the fourth network entity 4,
- the first module 22 and the Provisioning module 24.

The subscriber database 21 includes first subscription data 100 corresponding to the data stored with regard to pre-provisioned subscribers 11. Furthermore the database 21 includes profile data 120 corresponding to configuration of the network access of the pre-provisioned subscribers 11.

The Intelligent Subscription Management Center (ISMC) or second network entity 2 provides three main functions and acts as a Home Location Register (HLR)/Home Subscriber Server (HSS) in the network for the pre-provisioned subscribers before they become active.

The situation represented in FIG. 1 corresponds to a subscriber 11 (i.e. being, e.g., represented by any mobile terminal 11 having as SIM card (Subscriber Identity Module) or another identity module) attempting to have access to the communications network 10 for the first time (i.e. the SIM card or other identity module never had a telecommunications service requested from the network 10 before). In such a situation, the mobile terminal 11 (i.e. the subscriber 11) sends a message to the third network entity 3. The third network entity 3 sends a first message which is directed to the first network entity 1 and which is especially a Location Update message. This first message (i.e. generally a Location Update message) is captured or intercepted by the second network entity 2. The second network entity 2 recognizes that the first message has been sent by a (pre-provisioned, i.e. provisional) subscriber 11 attempting to have access to the network for the first time and that therefore, the first network entity 1 does not know the subscriber 11 yet (i.e. in a further subscriber database assigned to the first network entity 1, the subscriber 11 is not yet registered as an active subscriber). By way of a second message, the second entity 2 transmits an instruction to the first network entity 1 to provision the subscriber 11. After this subscription is completed in the first network entity 1, the subscriber 11 is an active subscriber in the telecommunications network 10. On the other hand, messages sent by the third network entity 3 to the first network entity 1 that are either

- messages not related to a first contact or attempt to contact the communications network 10 (e.g. messages that are no Location Update messages), or
- messages related to other subscribers that are known to the first network entity 1 as active subscribers are not intercepted by the second network entity 2 but forwarded to the first network entity 1.

FIGS. 2 and 3 schematically illustrate flow diagrams representing the flow of operations according to the present invention.

The diagram shown in FIG. 2 shows a workflow diagram for the operation of the second network entity 2 according to the first exemplary embodiment of the present invention, i.e. the Intelligent Subscription Management Center (ISMC), and especially the first module 22 of the second network entity 2. Initially (represented by reference numeral 510 in FIG. 2), the second network entity 2 waits for messages. In case an incoming message is received (represented by reference numeral 520 in FIG. 2) from the third network entity 3 (Visitor Location Register (VLR) or Mobile Management Entity (MME)), it is decided whether the message is a first message, i.e. especially whether the message is a Location Update message (represented by reference numeral 530 in FIG. 2). If the message is no first message (e.g. not a Location Update message), the message is transferred (represented by reference numeral 540 in FIG. 2) to the message destination, e.g. the first network entity 1 (Home Location Register (HLR) or Home Subscriber Server (HSS)) in which case the handling of this message is terminated (represented by reference numeral 599 in FIG. 2). If in step 530 the message is possibly a first message (e.g. a Location Update message), the subscriber database 21 of the second network entity 2 is searched (represented by reference numeral 550 in FIG. 2) and decided whether the subscriber 11 is a pre-active or pre-provisioned subscriber 11 (represented by reference numeral 560 in FIG. 2). If this is not the case (i.e. the identity of the subscriber 11 detected by way of, e.g., the International Mobile Subscriber Identity (IMSI) number and/or the Mobile Subscriber Integrated Services Digital Network (MSISDN) number and/or another identification information), the second network entity 2 knows that the subscriber 11 is known to the first network entity 1 and transfers the Location Update message to its destination, e.g. the first network entity 1 (represented by reference numeral 570 in FIG. 2) in which case the handling of this message is terminated (represented by reference numeral 599 in FIG. 2). If in step 560 it is detected that the subscriber 11 is a pre-active or pre-provisioned subscriber 11 (i.e. in the subscription database 21 of the second network entity 2 the identity of the subscriber 11 is found and therefore, the second network entity 2 knows that this subscriber 11 would not be recognized by the first network entity 1), the second message is generated by the second network entity 2 and transmitted to the first network entity 1 (represented by reference numeral 580 in FIG. 2) such that the subscriber 11 is provisioned by the first network entity 1. If the corresponding response from the first network entity 1 is positive (acknowledgment of the subscription procedure) (represented by reference numeral 590 in FIG. 2) the initial first message is transferred to its destination, i.e. for example the first network entity 1 and the handling of this message is terminated (represented by reference numeral 599 in FIG. 2). Alternatively, as an alternative variant on the operation of reference numeral 580, the initial first message is not transferred to its destination, i.e. for example the first network entity 1. In this case the third network entity 3, and subsequently the terminal 11 will not get a response on the initial first message (typically a Location Update). According to the standard the terminal 11 will retry after a certain time period. This retry will be successfully acknowledged as the subscriber is already in active state.

The diagram shown in FIG. 3 shows a workflow diagram for the operation of the second network entity 2 according to the first exemplary embodiment of the present invention, i.e. the Intelligent Subscription Management Center (ISMC), and especially the second module 23 of the second network entity 2. Initially (represented by reference numeral 610 in FIG. 3), the workflow waits for messages and commands. In case an initial provisioning message is received (represented by reference numeral 620 in FIG. 3) from the IT Provisioning System 25, this message or corresponding information is stored in the subscriber database 21. In case a provisioning instruction is received from the first module 22 of the second network entity 2 (represented by reference numeral 630 in FIG. 3), the first and fourth network entities 1, 4 are provisioned using default profiles 120 (represented by reference numeral 640 in FIG. 3). In a further step 650, it is decided whether this provisioning of the first and fourth network entities 1, 4 has been successful. If in step 650 the provision was not successful, the provisioning is performed again (represented by reference numeral 660 in FIG. 3). If in step 650 the provision was successful, a positive acknowledgement message is sent to the first module 22 of the second network entity 2 (represented by reference numeral 670 in FIG. 3). In a further step (represented by reference numeral 680 in FIG. 3), the respective subscriber 11 is deleted from the subscriber database 21 (as it is now an active subscriber).

Generally speaking, the first module 22 of the second network entity 2 acts as a signalling transfer point. MAP and DIAMETER messages related to active subscribers are transferred directly to the commercial Home Location Register (HLR)/Home Subscriber Server (HSS) (first network entity 1) that holds data for active subscribers. MAP and DIAMETER messages for pre-provisioned subscribers are intercepted and used to trigger the second module 23 to provision the first network entity 1 (and the fourth network entity 4), i.e. the commercial network nodes. The messages are then transferred to the commercial nodes after successful provisioning. The second module 23 of the second network entity 2 provisions the first network entity 1 and the fourth network entity 4 (or a plurality thereof) and provides an interface to the IT Provisioning System 25 to receive initial provisioning commands for pre-active customers. The second module 23 can also query the subscriber database 21 and delete/modify subscriber data. The subscriber database 21 holds some basic information about pre-provisioned subscribers, e.g. the MSISDN, the International Mobile Subscriber Identity (IMSI), the subscriber type, the Long Term Evolution (LTE) identity. If a subscriber is not present in the subscriber database 21 (for pre-provisioned subscribers), the second network entity 2 assumes that such a subscriber is an active subscriber of the communications network 10. The IT Provisioning System 25 provisions the Intelligent Subscription Management Center (ISMC) or second network entity 2 with pre-active customers. Modifications of profiles for active subscribers are assumed to be done directly on the commercial nodes such as the first network entity 1 (e.g. the Home Location Register (HLR), Home Subscriber Server (HSS) and other service nodes). Alternatively, the Intelligent Subscription Management Center (ISMC) can be used as a Gateway for subscriber modifications commands towards the first and fourth network entities. The Service Nodes hold subscriber related profiles or profile information for active subscribers.

Figure 5:
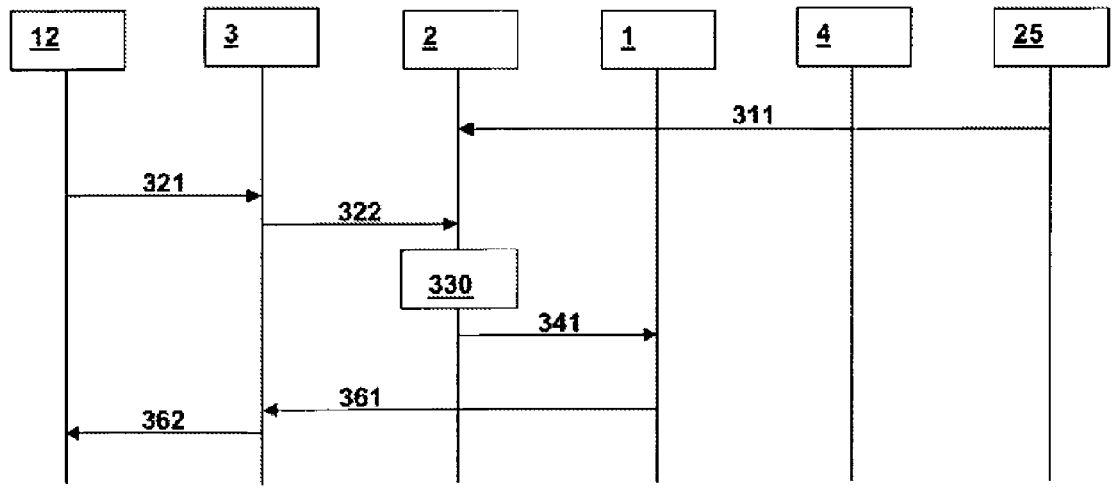

In FIGS. 4 and 5 communication diagrams according to the first exemplary embodiment of the present invention for a pre-provisioned subscriber and for an active subscriber are schematically illustrated. Both communication diagrams of FIGS. 4 and 5 show the message exchange between the mobile station of subscribers 11, 12, the third network entity 3 (usually a Visitor Location Register (VLR)/Mobile Management Entity (MME)), the second network entity 2, the first network entity 1 (usually a Home Location Register (HLR)/Home Subscriber Server (HSS)), the fourth network entity 4 and the IT Provisioning System 25.

In FIG. 4, the communication diagram for the first network contact of a pre-provisioned subscriber 11 is shown. Initially, the subscriber (pre-)provisioning is realized by a message 211 from the IT Provisioning System 25 to the second network entity 2. The subscriber database 21 then includes an entry regarding the subscriber 11. The subscriber 11 attempts to contact the network by way of a message 221 to the third network entity 3. This message is usually a Location Update message. The third network entity 3 sends the Location Update message as the first message 222 to the second network entity 2. In a step 230, the second network entity 2 (or Intelligent Subscription Management Center (ISMC)) validates that the subscriber 11 is a pre-active subscriber. The second network entity 2 then sends a Create subscriber message as a second message 241 to the first network entity 1, which is acknowledged by a return message 242. The second network entity 2 then sends a Create subscriber message as a third message 243 to the fourth network entity 4, which is acknowledged by a return message 244. In a step 250, the second network entity 2 receives the successful acknowledgement messages from the first and fourth network entities 1, 4 for the provisioning and sends a delayed Location update message 261 to the first network entity 1, this message being acknowledged by Location update responses 262 (from the first network entity 1 to the third network entity 3) and 263 (from the third network entity 3 to the subscriber 11). In a step 270, the subscriber 11 is deleted from the subscriber database 21 meaning the subscriber 11 is active.

According to an alternative embodiment, the delayed Location update message 261 as well as the Location update responses 262 (from the first network entity 1 to the third network entity 3) and 263 (from the third network entity 3 to the subscriber 11) are omitted. However, the subscriber 11 is deleted from the subscriber database 21 in step 270. The omission of the delayed Location update message 261 results in not forwarding the initial first message to its destination, i.e. for example the first network entity 1. In this case the third network entity 3, and subsequently the terminal 11 will not get a response (Location update responses 262, 263) on the initial first message (typically a Location Update). According to the standard the terminal 11 will retry after a certain time period. This retry will be successfully acknowledged as the subscriber 11 is already in active state.

In FIG. 5, the communication diagram for a network contact of an active subscriber 12 is shown. Initially, the subscriber provisioning has been performed by a message 311 from the IT Provisioning System 25 to the second network entity 2. The subscriber 12 attempts to contact the network 10 by way of a message 321 to the third network entity 3. This message is usually a Location Update message. The third network entity 3 sends the Location Update message 322 to the second network entity 2. In a step 330, the second network entity 2 (or Intelligent Subscription Management Center (ISMC)) validates that the subscriber 12 is not a pre-active subscriber. The second network entity 2 then sends a Location update message 341 to the first network entity 1, this message being acknowledged by Location update responses 361 (from the first network entity 1 to the third network entity 3) and 362 (from the third network entity 3 to the subscriber 12).

FIG. 6 schematically illustrates a communication diagram according to the second exemplary embodiment of the present invention. In FIG. 6, the message exchange between the mobile station of the subscriber 11, the third network entity 3 (usually a Visitor Location Register (VLR)/Mobile Management Entity (MME)), a fifth network entity 5, the second network entity 2, the first network entity 1 (usually a Home Location Register (HLR)/Home Subscriber Server (HSS)), the fourth network entity 4 and the IT Provisioning System 25 is shown. The fifth network entity 5 provides for reduced traffic within the second network entity as all such messages sent from subscribers known to be active subscribers are not handled by the second network entity 2 but are routed directly to the first network entity 1.

In FIG. 6, the communication diagram for the first network contact of a pre-provisioned subscriber 11 is shown. Initially, the subscriber (pre-)provisioning is realized by a message 211 from the IT Provisioning System 25 to the second network entity 2. The subscriber database 21 then includes an entry regarding the subscriber 11. The second network entity 2 then notifies the fifth network entity 5 that the subscriber 11 is pre-active (or pre-provisioned) by way of message 212. The subscriber 11 attempts to contact the network by way of a message 221 to the third network entity 3. This message is usually a Location Update message. The third network entity 3 sends the Location Update message as the first message 222 to the fifth network entity 5. In a step 235, the fifth network entity 5 determines that the International Mobile Subscriber Identity (IMSI) and/or the MSISDN number of the subscriber 11 points to the second network entity 2. The fifth network entity 5 then sends a Location Update message 236 to the second network entity 2. In a step 230, the second network entity 2 (or Intelligent Subscription Management Center (ISMC)) validates that the subscriber 11 is a pre-active subscriber. The second network entity 2 then sends a Create subscriber message as a second message 241 to the first network entity 1, which is acknowledged by a return message 242. The second network entity 2 then sends a Create subscriber message as a third message 243 to the fourth network entity 4, which is acknowledged by a return message 244. In a step 250, the second network entity 2 receives the successful acknowledgement messages from the first and fourth network entities 1, 4 for the provisioning, deletes the subscriber 11 from the subscriber database 21 and sends a Location update message 266 to the first network entity 1, this message being acknowledged by Location update responses 268 (from the first network entity 1 to the third network entity 3) and 269 (from the third network entity 3 to the subscriber 11). Furthermore after step 250, the second network entity 2 sends a message 265 to the fifth network entity 5 so that the pointer registered in the fifth network entity (regarding Location Update messages from subscriber 11) is set to the first network entity 1 such that a subsequent Location Update message from the subscriber 11 is directly sent to the first network entity 1 and not routed through the second network entity 2. In a step 270, the subscriber 11 is deleted from the subscriber database 21 meaning the subscriber 11 is active. According to an alternative embodiment, the delayed Location update message 266 as well as the Location update responses 268 (from the first network entity 1 to the third network entity 3) and 269 (from the third network entity 3 to the subscriber 11) are omitted. However, the subscriber 11 is also deleted from the subscriber database 21 in step 270.

Figure 7:
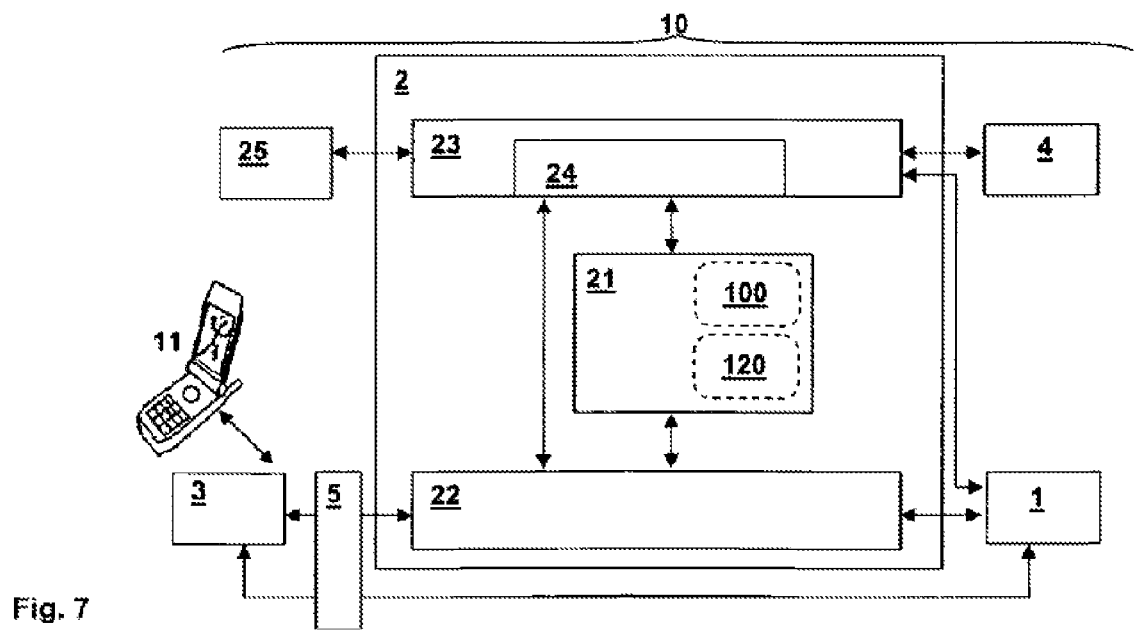
FIG. 7 schematically illustrates a part of a telecommunications network including different network entities according to the second exemplary embodiment.

FIG. 7 schematically illustrates a part of a telecommunications network 10 including different network entities according to the second exemplary embodiment. The first, third and fourth network entity 1, 3, 4 as well as the IT provisioning system 25 correspond to the first exemplary embodiment of the present invention (see FIG. 1). The second network entity 2 according to the second exemplary embodiment corresponds mainly to the second network entity 2 according to the first exemplary embodiment. The difference is that in the second exemplary embodiment, the fifth network entity, a so-called STP (Signalling transfer point) which is provided external to the second network entity 2, is used to reduce the traffic through the second network entity 2.

Also according to the second exemplary embodiment, the second network entity 2 includes a subscriber database 21, a first module 22 and a second module 23. The first module 22 is preferably configured as a Signalling Analysis and Transfer Module 22 including a multitude of interfaces, especially an interface according to the MAP protocol (for GSM/UMTS messages) and an interface for the DIAMETER protocol (for LTE messages). Parts of the functions of the first module 22 (according to the first exemplary embodiment) are realized according to the second exemplary embodiment by the fifth network entity 5. The second module 23 is unchanged according to the second exemplary embodiment. Preferably SS7/MAP/DIAMETER signalling interfaces are provided between the third network entity 3 and the first module 22/fifth network entity 5 on the one hand and between the first network entity 1 and the first module 22/fifth network entity 5 on the other hand.

Figure 8:
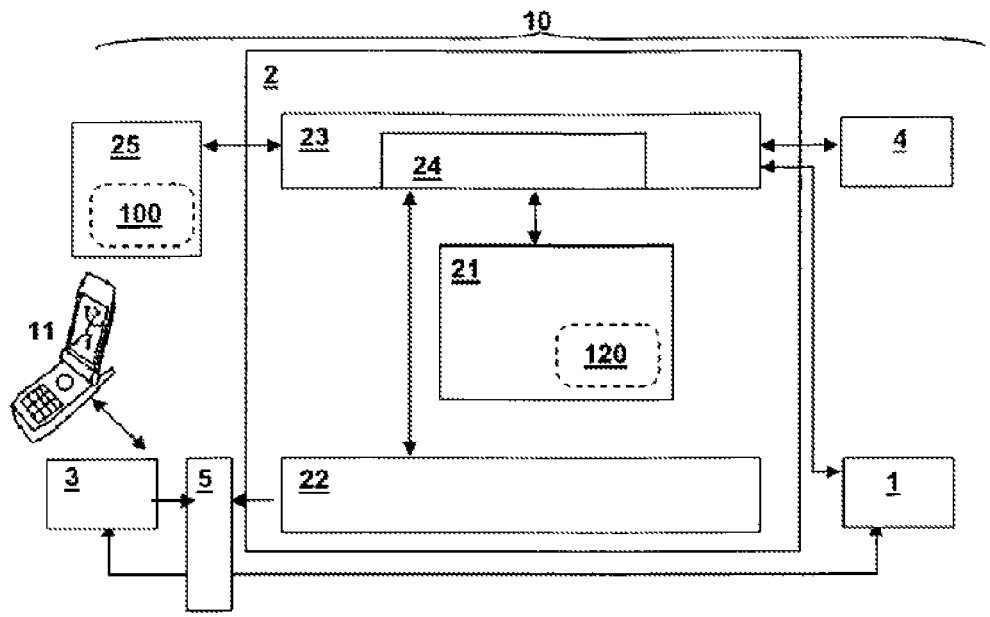
FIG. 8 schematically illustrates a communication diagram according to a third exemplary embodiment of the present invention.

FIG. 8 schematically illustrates a part of a telecommunications network 10 including different network entities according to the third exemplary embodiment of the present invention. A first network entity 1 provides the functions of a Home Location Register (HLR) and/or of a Home Subscriber Server (HSS). A third network entity 3 provides the functions of a Visitor Location Register (VLR) and/or a Mobile Management Entity (MME). A fourth network entity 4 provides the functions of a Service Node such as an Intelligent Network Service Control Point (IN/SCP) and/or a Voice Messaging System (VMS) and/or a Multimedia Message Service Center (MMSC) and/or any other service node in the telecommunications network 10. A second network entity 2 is configured as an Intelligent Subscription Management Center (ISMC) according to the third exemplary embodiment of the present invention and serves as a provisioning entity for subscriber-related provisioning information to the fifth network entity 5 and to the fourth network entity 4. The origin of the subscriber information is a so-called IT provisioning system 25 linked to the Intelligent Subscription Management Center (ISMC) or second network entity 2.

According the third exemplary embodiment of the present invention, the second network entity 2 includes a profile database 21', a first module 22 and a second module 23. The first module 22 is preferably configured as an STP Provisioning Module for provisioning the fifth network entity 5. The second module 23 is preferably configured as a Subscription Management Module 23 including a Provisioning module 24. A database query and modification interface is provided preferably between the second module 23 and the profile database 21' (used by the second module 23 of the second network entity 2 to query, create, modify and delete a profile in the profile database 21'). A provisioning interface is provided preferably between:

the IT provisioning system 25 and the second module 23,
the first network entity 1 and the second module 23,
the second module 23 and the fourth network entity 4,
the first module 22 and the fifth network entity 5.

Different from the first exemplary embodiment, the interface between the first module 22 and the profile database 21' of the second network entity 2 is not required.

The fifth network entity 5 (STP) is provisioned by the IT provisioning system 25, via the second network entity (ISMC). As a minimum, the following subscriber information is stored as part of the database of the fifth network entity 5 (STP):

IMSI
MSISDN
HLR ID

The database of the fifth network entity 5 is especially a routing database or a routing table indicating a target (to route a message to) for each International Mobile Subscriber Identification (IMSI).

In the context of the third exemplary embodiment of the present invention, the HLR ID is a Global Title. For active subscribers, the Global Title is of type 3 MGT (Mobile Global Title) which is unique per active subscriber as it is derived from IMSI and MSISDN. For pre-provisioned subscribers, the Global Title is of a different type (MSISDN/type1 or IMSI/type2). The STP uses the SN/MSIN part of the Global Title to route the message to the right HLR.

The HLR ID for pre-provisioned subscribers (being of type 1 or 2) contains an identifier related to the default HLR profile to be used for this specific subscriber. In preferred variants of the third exemplary embodiment of the present invention, a specific digit or a plurality of specific digits of the SN/MSIN part of the GT are used for transferring the identifier related to the default HLR profile to be used for this specific subscriber. The Home Location Register (HLR) profile is the profile information to be used to generate the subscriber in the first network entity 1. Other digits of the SN/MSIN are preferably used to indicate the right Home Location Register (HLR) (especially in case of a plurality of different HLRs).

Changing the state of the subscriber in the STP is done by way of changing the HLR ID for that specific subscriber.

The profile database 21' as part of the second network entity 2 includes profile data 120 corresponding to services provided by the service node (i.e network entity 4). Profile data 120 contains a limited set of default profiles related to the service nodes. It is not necessary for the correct functioning of the third exemplary embodiment to store subscriber-specific subscription data 100 within the second network entity 2. According to the third exemplary embodiment, the subscription data 100 of the pre-provisioned subscribers (including subscriber specific profile data or the like) are not stored in the second network entity 2 but—besides being stored in the IT provisioning system 25—there is a subscriber specific routing information stored in the fifth network entity 5 (Signal Transfer Point). The following information is stored in the profile data 120:

HLR ID #1:
STANDARD SERVICE PROFILE 11
STANDARD SERVICE PROFILE 12
STANDARD SERVICE PROFILE 1n
HLR ID #2:
STANDARD SERVICE PROFILE 21
STANDARD SERVICE PROFILE 22
STANDARD SERVICE PROFILE 23
HLR ID #m:
STANDARD SERVICE PROFILE m1
STANDARD SERVICE PROFILE m2
STANDARD SERVICE PROFILE mn wherein n identifies the number of different standard service profiles related to service nodes and m represents the number of different HLR ID's.

The first network entity (HLR/HSS) contains a limited set of default HLR/HSS profiles (profile information). The following is stored on the first network entity (HLR):

HLR ID #1:
STANDARD HLR PROFILE 1
HLR ID #2:
STANDARD HLR PROFILE 2
HLR ID #m:
STANDARD HLR PROFILE m

In the context of the third exemplary embodiment of the present invention, the HLR ID is a Global Title. For active subscribers, the Global Title is of type MGT (Mobile Global Title) which is unique per active subscriber as it is derived from IMSI and MSISDN. For pre-provisioned subscribers, the Global Title is of a different type 1 or 2 (MSISDN or IMSI). The HLR can differentiate the actions to be taken by analyzing the SCCP Called Party Address (CdPA), which includes the Global Title as well as the type of the Global Tile (e.g E.214 or E.164). If the Global Title is, e.g., of type 1 (i.e E.164) then the HLR concludes that the subscriber is a pre-active subscriber. If the Global Title is of type 3 (i.e E.214) then the HLR concludes that the subscriber is an active subscriber.

FIG. 9 schematically illustrates a communication diagram according to the third exemplary embodiment of the present invention. In FIG. 9, the message exchange between the mobile station of the subscriber 11, the third network entity 3 (usually a Visitor Location Register (VLR)/Mobile Management Entity (MME)), a fifth network entity 5, the second network entity 2, the first network entity 1 (usually a Home Location Register (HLR)/Home Subscriber Server (HSS)), the fourth network entity 4 and the IT Provisioning System 25 is shown. According to the third exemplary embodiment of the present invention, the fifth network entity 5 provides for a reduced traffic within the second network entity 2 as all such messages sent from subscribers (both active and pre-provisioned) are not handled by the second network entity 2 but are routed directly to the first network entity 1.

In FIG. 9, the communication diagram (according to the third exemplary embodiment of the present invention) for the first network contact of a pre-provisioned subscriber 11 is shown. Initially, the subscriber (pre-)provisioning is realized by a message 211 from the IT Provisioning System 25 to the second network entity 2. The second network entity 2 then notifies the fifth network entity 5 that the subscriber 11 is pre-active (or pre-provisioned) by way of message 212. The subscriber 11 attempts to contact the network by way of a message 221 to the third network entity 3. This message is usually a Location Update message. The third network entity 3 sends the Location Update message as the first message 222 to the fifth network entity 5. In a step 235, the fifth network entity 5 determines the information to be forwarded to the first network entity 1 based on the (routing) database within the fifth network entity 5. The information stored in this database of the fifth network entity 5 indicates whether the International Mobile Subscriber Identity (IMSI) and/or the MSISDN number of the subscriber 11 is related to a pre-provisioned subscriber or to an active subscriber. Furthermore, the information stored in the database of the fifth network entity 5 indicates the first network entity 1 that should be used to route the message to. The fifth network entity 5 then sends the Location Update message 236 as a second message to the correct first network entity 1. The second message 236 (according to the third exemplary embodiment) includes the indication that the subscriber is a pre-provisioned (not yet an active) subscriber and includes the HLR PROFILE ID for this specific subscriber. In a step 230, the first network entity 1 (or HLR/HSS) validates that the subscriber 11 is a pre-active subscriber and creates and activates the subscriber in the HLR database using the profile belonging to the HLR PROFILE ID received in the second message 236. The first network entity 1 then sends a Create subscriber message 241 (fifth message) to the second network entity 2. The second network entity 2 then sends a Create subscriber message 243 (sixth message) to the fourth network entity 4, which is acknowledged by a return message 244. In a step 250, the second network entity 2 receives the successful acknowledgement messages from the fourth network entity 4 for the provisioning of the subscriber 11. The second network entity 2 then sends a Change subscriber status as a seventh message 242 to the fifth network entity 5 (which is acknowledged by a return message 245) and sends message 246 to the first network entity 1 indicating that the provisioning of the fourth network entity 4 is realised and that the subscriber has been activated in the fifth network entity 5. The first network entity 1 then sends an acknowledgment message related to the first message 222 by Location update responses 268 (from the first network entity 1 to the third network entity 3) and 269 (from the third network entity 3 to the subscriber 11).

In FIG. 9 the subscriber 11 attempts to contact the network by way of a message 221 to the third network entity 3. This message is usually a Location Update message. The third network entity 3 sends the Location Update message 222 via the fifth network entity 5 to the right first network entity 1. Location Update messages use the SS7 MAP Protocol which in turn relies on SCCP layer of the SS7 protocol stack.

A Global Title (GT) is an address used in the SCCP protocol for routing signaling messages on telecommunications networks. In theory, a global title is a unique address which refers to only one destination (i.e a network entity in a mobile network), though in practice different global titles (GT's) can be allocated to one destination (i.e. a network entity in a mobile network).

Mainly there are three types of GT in use in mobile networks known as E.164 (MSISDN), E.212 (IMSI) and E.214 (Mobile Global Title):

Type 1: E.164(MSISDN)=CC+NDC+SN
Type 2: E.212(IMSI)=MCC+MNC+MSIN
Type 3: E.214(MGT)=combination of E.212 and E.164 (e.g CC+NDC+MSIN)

wherein:
CC corresponds to the Country Code
NDC corresponds to the National Destination Code, identifies one or part of a PLMN
SN corresponds to the Subscriber Number
MCC corresponds to the Mobile Country Code
MSIN corresponds to the Mobile Station Identification Number In a mobile network, for the purpose of routing messages, the third network entity (MSC/VLR) converts the IMSI to a Mobile Global Title (MGT).

FIGS. 11 and 12 schematically illustrate flow diagrams representing the flow of operations according to the third exemplary embodiment of the present invention.

The diagram shown in FIG. 11 shows a workflow diagram for the operation of the first network entity 1 according to the third exemplary embodiment of the present invention.

The diagram shown in FIG. 12 shows a workflow diagram for the operation of the second network entity 2 according to the third exemplary embodiment of the present invention.

FIG. 11 shows that the first network entity 1 receives a location update message (represented by reference numeral 810 in FIG. 11) as second message from the fifth network entity 5) and analyzes the global title type on the SCCP layer (represented by reference numeral 820 in FIG. 11). The first network entity 1 checks whether the subscriber 11 is an active subscriber (i.e. whether the message is related to an active subscriber (Global Title of Type 3)), which is represented by reference numeral 830 in FIG. 11. If the second message received by the first network entity 1 includes a global title of a specified type (in the example of Type 3), the first network entity 1 proceeds with its normal operation, sends a positive acknowledgment to the third network entity 3 (via the fifth network entity 5), which is represented by reference numeral 840 in FIG. 11, and terminates the processing (represented by reference numeral 899 in FIG. 11). If the second message received by the first network entity 1 includes a global title of another specified type (in the example of Type 1 or 2), the first network entity 1 creates and activates the subscriber using the correct profile based on the profile information (profile ID) received in the second message, which is represented by reference numeral 850 in FIG. 11. Then, the first network entity 1 sends a message (fifth message) to the second network entity 2 (ISMC) indicating the successful activation of the subscriber in the first network entity 1 (typically Home Location Register). After receiving a positive message from network entity 2 about the successful creation of the profiles of the fourth network entity 4 and the successful change of subscriber state in the fifth network entity 5, the first network entity 1 consequently sends a positive acknowledgment to the third network entity 3 (via the fifth network entity 5), which is represented by reference numeral 860 in FIG. 11, and terminates the processing (represented by reference numeral 899 in FIG. 11).

FIG. 12 shows that the second network entity 2 receives the fifth message from the first network entity 1 (represented by reference numerals 910 and 920 in FIG. 11) containing an information about an activated subscriber (International Mobile Subscriber Identification (IMSI), MSISDN, Home Location Register (HLR) ID). In a step represented by reference numeral 930, a provisioning message is sent to all service nodes (fourth network entities 4) using the correct profile based on the Home Location Register (HLR) ID received from the first network entity 1. In a further step represented by reference numeral 940, a message is sent to the fifth network entity 5 (Signal Transfer Point) instructing the fifth network entity 5 to change the routing information contained in its database related to the subscriber (e.g. move the subscriber from a pre-active state to an active state). As part of the same step 940, the second network entity 2, informs the first network entity 1 about the successful creation of the profiles of network entity 4 and the successful change of subscriber state in the fifth network entity 5. Then, the processing is terminated (represented by reference numeral 999 in FIG. 11).

The processing flow preferably branches from the step represented by reference numeral 940 of FIG. 12 (indicated by an arrow) to the step represented by reference numeral 860 of FIG. 11 (also indicated by an arrow).

Figure 10:
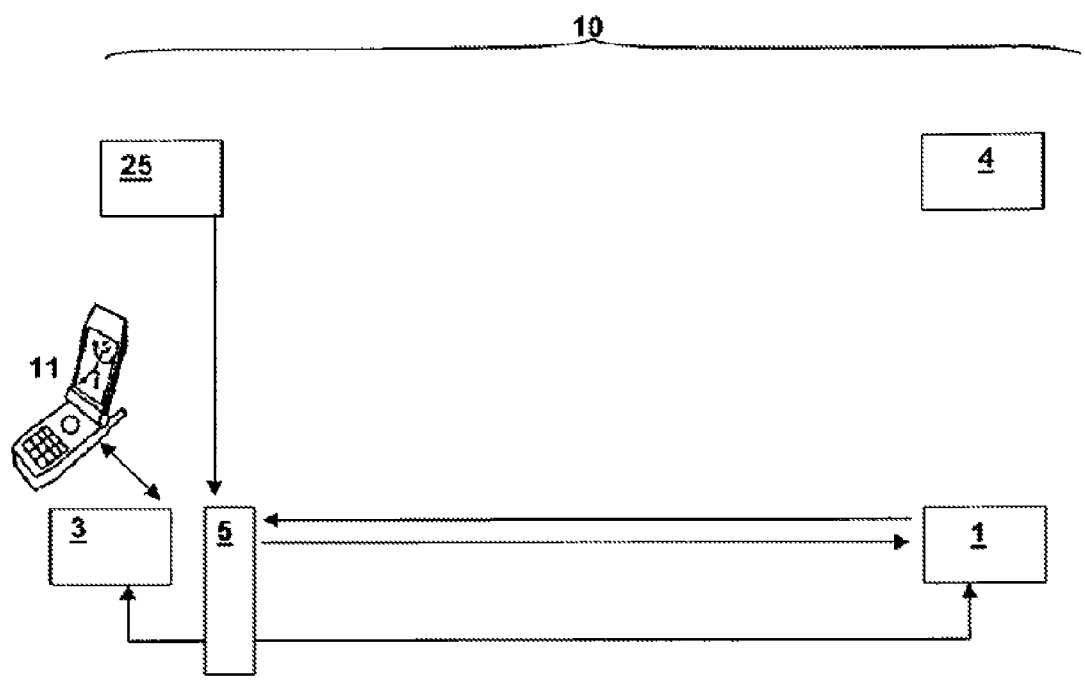
FIG. 10 schematically illustrates a communication diagram according to a variant of the third exemplary embodiment of the present invention.

In a second variation of the third exemplary embodiment shown in FIG. 10, the second network entity 2 (ISMC or any other pre-provisioning system) is not required at all. This is the case if the provisioning of the service nodes (fourth network entity 4) is not required. In this case the IT provisioning system 25 provisions the STP database (database of the fifth network entity 5) directly and the HLR (first network entity 1) provides the interface to the STP (fifth network entity 5) for instructing the STP to change the status of a subscriber from pre-active to an active state.

The invention claimed is:

1. A method for handling subscription data in a telecommunications network having first, third, and fifth network entities, the first network entity providing the functions of at least one of a Home Subscriber Server (HSS) and a Home Location Register (HLR), the third network entity providing the functions of at least one of a Visitor Location Register (VLR) and a Mobile Management Entity (MME), and the fifth network entity providing routing functionality, the method comprising:
    storing first subscription data, wherein the first subscription data is provisional subscription data of a provisional subscriber not yet active in the telecommunications network;
    receiving, by the fifth network entity, a first message with regard to the subscriber, wherein the first message is sent by the third network entity and is directed to the first network entity; and
    sending, by the fifth network entity, a second message to the first network entity, the second message comprising an indication that a subscription of the subscriber is a provisional subscription;
    wherein the first network entity comprises default profile information that is not specific to the subscriber for provisioning the subscriber to become an active subscriber;
    wherein the telecommunications network further has a second network entity and a fourth network entity, the second network entity providing a subscription management function, and the fourth network entity providing the functions of a Service Node providing a service, wherein the method further comprises:
    sending, by the first network entity, a fifth message to the second network entity;
    sending, by the second network entity, a sixth message to the fourth network entity, the sixth message comprising the first subscription data to enable the service provided by the fourth network entity for the subscriber.

2. The method according to claim 1, wherein the second message comprises a Global Title of the type Mobile Station International Subscriber Directory Number (MSISDN, E.164) or of the type International Mobile Subscriber Identity (IMSI, E.212).

3. The method according to claim 2, wherein as part of the Global Title of the second message, digits are used to convey a profile ID information to the first network entity.

4. The method according to claim 1, wherein the fourth network entity is a Service Node providing the functions of at least one of a Multimedia Message Service Center (MMSC), a Voicemailbox Service Node, an Intelligent Network Service Control Point (IN/SCP), or a services profile database that hold specific subscriber profile information for a mobile service.

5. The method according to claim 1, wherein the first message is a Location Update message associated with the subscription of the subscriber to the telecommunications network.

6. A network entity providing routing functionality in a telecommunications network having first and third network entities, the first network entity providing the functions of at least one of a Home Subscriber Server (HSS) and a Home Location Register (HLR), and the third network entity providing the functions of at least one of a Visitor Location Register (VLR) and a Mobile Management Entity (MME), the network entity comprising:
    a processor configured to receive a first message with regard to a provisional subscriber, wherein the first message is sent by the third network entity and is directed to the first network entity, and to send a second message to the first network entity, wherein the second message comprises an indication that a subscription of the subscriber is a provisional subscription, and
    wherein the first network entity comprises default profile information that is not specific to the subscriber for provisioning the subscriber to become an active subscriber;
    wherein the telecommunications network further has a second network entity and a fourth network entity, the second network entity providing a subscription management function, and the fourth network entity providing the functions of a Service Node providing a service;
    wherein the first network entity is configured to send a fifth message to the second network entity;
    wherein the second network entity is configured to send a sixth message to the fourth network entity, the sixth message comprising the first subscription data to enable the service provided by the fourth network entity for the subscriber, wherein the first subscription data is provisional subscription data of a provisional subscriber not yet active in the telecommunications network; and
    wherein the processor is further configured to receive a Change subscriber status as a seventh message from the second network entity.

7. The network entity according to claim 6, wherein the second message comprises a Global Title of the type Mobile Station International Subscriber Directory Number (MSISDN, E.164) or of the type International Mobile Subscriber Identity (IMSI, E.212).

8. A telecommunications network, comprising:
    a first network entity providing the functions of at least one of a Home Subscriber Server (HSS) and a Home Location Register (HLR);
    a third network entity providing the functions of at least one of a Visitor Location Register (VLR) and a Mobile Management Entity (MME),
    a fifth network entity providing routing functionality, configured to receive a first message with regard to a provisional subscriber, wherein the first message is sent by the third network entity and is directed to the first network entity, and to send a second message to the first network entity, wherein the second message comprises an indication that a subscription of the subscriber is a provisional subscription; and
    wherein the first network entity comprises default profile information that is not specific to the subscriber for provisioning the subscriber to become an active subscriber;

wherein the telecommunications network further comprises:
- a second network entity providing a subscription management function; and
- a fourth network entity providing the functions of a Service Node providing a service;

wherein the first network entity is configured to send a fifth message to the second network entity;

wherein the second network entity is configured to send a sixth message to the fourth network entity, the sixth message comprising the first subscription data to enable the service provided by the fourth network entity for the subscriber, wherein the first subscription data is provisional subscription data of a provisional subscriber not yet active in the telecommunications network.

9. The telecommunications network according to claim 8, wherein the second message to the first network entity comprises:
- a Global Title of the type Mobile Station International Subscriber Directory Number (MSISDN, E.164) or of the type International Mobile Subscriber Identity (IMSI, E.212).

10. One or more non-transitory computer-readable media having computer-executable instructions for handling subscription data in a telecommunications network having first, third, and fifth network entities, the first network entity providing the functions of at least one of a Home Subscriber Server (HSS) and a Home Location Register (HLR), the third network entity providing the functions of at least one of a Visitor Location Register (VLR) and a Mobile Management Entity (MME), and the fifth network entity providing routing functionality stored thereon, the computer-executable instructions comprising instructions for:

- storing first subscription data, wherein the first subscription data is provisional subscription data of a provisional subscriber not yet active in the telecommunications network;
- receiving, by the fifth network entity, a first message with regard to the subscriber, wherein the first message is sent by the third network entity and is directed to the first network entity;
- sending, by the fifth network entity, a second message to the first network entity, the second message comprising an indication that a subscription of the subscriber is a provisional subscription;

wherein the first network entity comprises default profile information that is not specific to the subscriber for provisioning the subscriber to become an active subscriber;

wherein the telecommunications network further has a second network entity and a fourth network entity, the second network entity providing a subscription management function, and the fourth network entity providing the functions of a Service Node providing a service, the wherein the computer-executable instructions further comprise instructions for:

- sending, by the first network entity, a fifth message to the second network entity;
- sending, by the second network entity, a sixth message to the fourth network entity, the sixth message comprising the first subscription data to enable the service provided by the fourth network entity for the subscriber.

\* \* \* \* \*